(12) United States Patent
Bozeman et al.

(10) Patent No.: US 7,876,531 B2
(45) Date of Patent: Jan. 25, 2011

(54) VIRTUAL FRONT SHIELD WRITER

(75) Inventors: Steven Paul Bozeman, Savage, MN (US); Olle Gunnar Heinonen, Eden Prairie, MN (US); Sining Mao, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1035 days.

(21) Appl. No.: 11/651,245

(22) Filed: Jan. 9, 2007

(65) Prior Publication Data

US 2008/0165452 A1    Jul. 10, 2008

(51) Int. Cl.
*G11B 5/187*    (2006.01)
(52) U.S. Cl. ....................................... 360/136
(58) Field of Classification Search .................. None
See application file for complete search history.

(56) References Cited

U.S. PATENT DOCUMENTS

| | | |
|---|---|---|
| 4,656,546 A | 4/1987 | Mallory |
| 4,748,525 A | 5/1988 | Perlov |
| 6,693,769 B2 * | 2/2004 | Hsu et al. ............... 360/125.63 |
| 6,754,049 B1 * | 6/2004 | Seagle et al. ................. 360/317 |
| 6,775,099 B2 | 8/2004 | Kuroda et al. |
| 6,798,615 B1 | 9/2004 | Litvinov et al. |
| 6,842,313 B1 | 1/2005 | Mallary |
| 6,876,519 B1 | 4/2005 | Litvinov et al. |
| 6,954,340 B2 | 10/2005 | Shukh et al. |
| 6,965,494 B2 | 11/2005 | Campbell et al. |
| 7,054,105 B2 | 5/2006 | Mochizuki et al. |
| 7,126,790 B1 * | 10/2006 | Liu et al. ............... 360/125.53 |
| 7,130,153 B2 * | 10/2006 | Shen et al. ............. 360/125.55 |
| 7,199,974 B1 * | 4/2007 | Alfoqaha ............... 360/123.09 |
| 7,239,478 B1 * | 7/2007 | Sin et al. .................. 360/125.3 |
| 7,310,204 B1 * | 12/2007 | Stoev et al. ............ 360/123.02 |

* cited by examiner

*Primary Examiner*—Mark Blouin
(74) *Attorney, Agent, or Firm*—Kinney & Lange, P.A.

(57) ABSTRACT

A magnetic writer includes a first write element and a second write element. The first write element produces a first field when a first current is passed through a first coil. The second write element, which is disposed relative to the first write element, produces a second field when a second current is passed through a second coil such that the second field at least partially opposes the first field.

23 Claims, 3 Drawing Sheets

VIRTUAL FRONT SHIELD WRITER

BACKGROUND OF THE INVENTION

The present invention relates to magnetic devices. More particularly, the present invention relates to a magnetic writer that includes a virtual front shield structure for improving the down-track field gradient of the magnetic writer.

Two general techniques for magnetically recording information on a storage medium include longitudinal recording and perpendicular recording. In longitudinal recording, the direction of the magnetization in the plane of the storage medium is altered in a manner to store information. In perpendicular recording, the magnetization of the storage medium is altered in a direction that is perpendicular to the plane of the medium. With the magnetization direction perpendicular to the plane of the medium as opposed to parallel with the plane, information can be stored at higher density.

There has been an ongoing effort to increase areal densities in magnetic recording. High areal densities can be achieved in a perpendicular recording system by increasing the linear and/or track densities. For high linear densities, the transition parameter of a bit transition, as well as the transition jitter, need to be minimized. The actual values of the transition parameter and the transition jitter will depend upon both the properties of the recording medium and the on-track field gradient of the write head. The write field gradient should approximate a step (i.e., an infinite slope of the field gradient) at the dynamic coercivity of the recording medium being used. In a similar manner, the track density that can be obtained will depend, in part, on the off-track field gradient of the write head.

BRIEF SUMMARY OF THE INVENTION

The present invention relates to a magnetic writer that includes a first write element and a second write element. The first write element produces a first field when a first current is passed through a first coil. The second write element, which is disposed relative to the first write element, produces a second field when a second current is passed through a second coil such that the second field at least partially opposes the first field.

DETAILED DESCRIPTION

Figure 1:
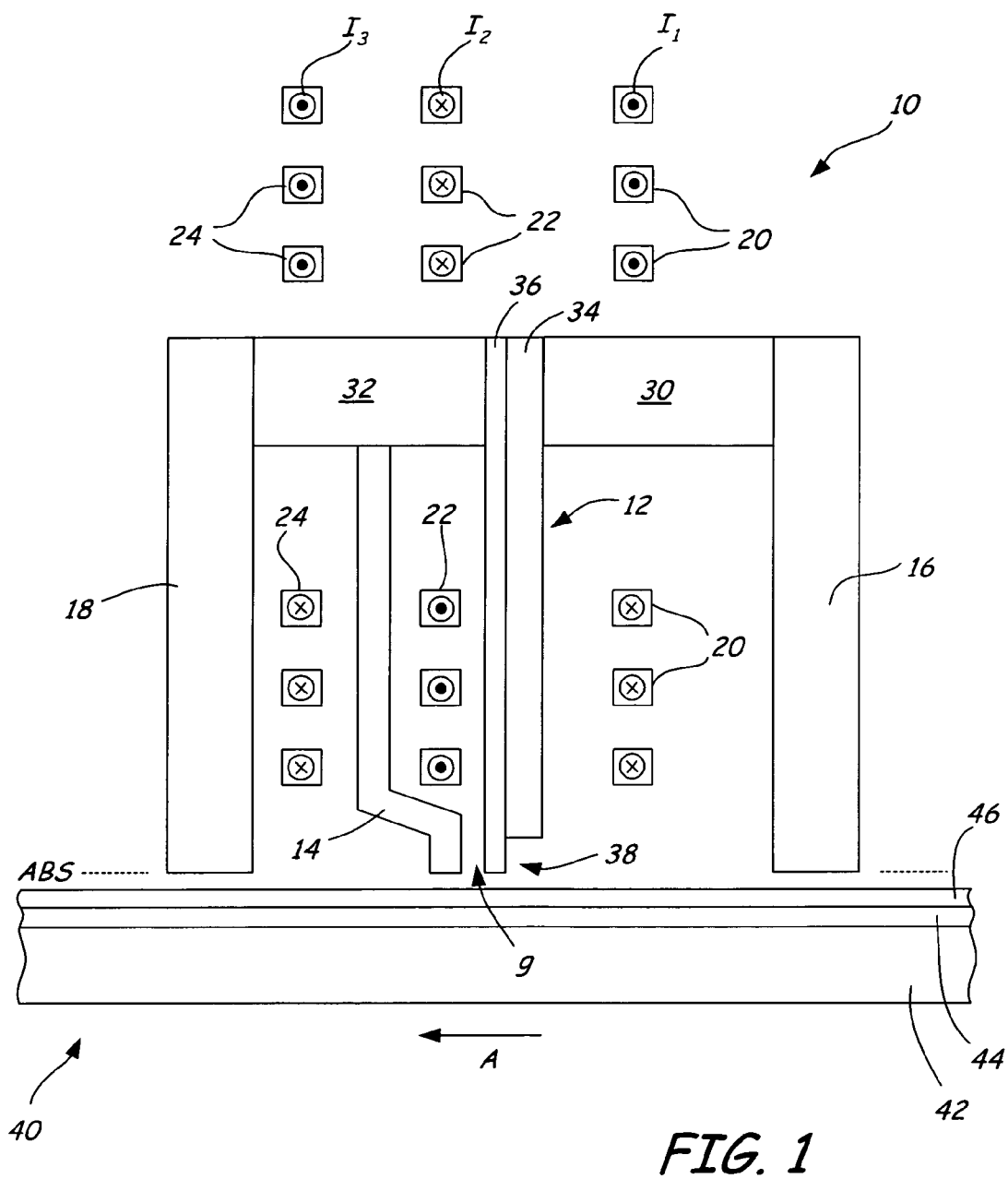
FIG. 1 is a cross-sectional view of a magnetic writer including primary and secondary write poles driven by separate conductive coils.

FIG. 1 is a cross-sectional view of a magnetic writer 10, which includes main pole 12, main pole 14, return pole 16, and return pole 18. Magnetic writer 10 also includes conductive coil 20, conductive coil 22, and conductive coil 24 (i.e., conductors). Conductive coil 20 surrounds magnetic stud 30 that magnetically couples main pole 12 to return pole 16. Conductive coil 22 and conductive coil 24 surround magnetic stud 32 that magnetically couples main pole 12, main pole 14, and return pole 18. Conductive coil 22 is disposed between main pole 12 and main pole 14, and conductive coil 24 is disposed between main pole 14 and return pole 18. Main pole 12 includes yoke 34 and main pole body 36 including main pole tip 38. Yoke 34 is coupled to an upper surface of main pole body 36. Main pole 12 and main pole 14 are separated by a gap g at the air bearing surface (ABS), which may be less than about 200 nm.

Return pole 16, return pole 18, magnetic stud 30, and magnetic stud 32 may comprise soft magnetic materials, such as NiFe. Conductive coils 20, 22, and 24 may comprise a material with low electrical resistance, such as Cu. Main pole body 36 and main pole 14 may comprise a high moment soft magnetic material, such as CoFe. Yoke 34 may comprise a soft magnetic material, such as NiFe, to improve the efficiency of flux delivery to main pole body 36.

Magnetic writer 10 confronts magnetic medium 40 at an ABS of main pole 12, main pole 14, return pole 16, and return pole 18. Magnetic medium 40 includes substrate 42, soft underlayer (SUL) 44, and medium layer 46. SUL 44 is disposed between substrate 42 and medium layer 46. Magnetic medium 40 is positioned proximate to magnetic writer 10 such that the surface of medium layer 46 opposite SUL 44 faces main poles 12 and 14. Magnetic medium 40 is shown merely for purposes of illustration, and may be any type of medium that can be used in conjunction with magnetic writer 10, such as composite media, continuous/granular coupled (CGC) media, discrete track media, and bit-patterned media.

Magnetic writer 10 is carried over the surface of magnetic medium 40, which is moved relative to magnetic writer 10 as indicated by arrow A such that main pole 12 trails return pole 16, leads return pole 18, and is used to physically write data to magnetic medium 40. In order to write data to magnetic medium 40, current $I_1$ is caused to flow through first conductive coil 20. The magnetomotive force in the coils causes magnetic flux to travel from main pole tip 38 perpendicularly through medium layer 46, across SUL 44, and through return pole 16 and first magnetic stud 30 to provide a closed magnetic flux path. The direction of the write field at the medium confronting surface of main pole tip 38, which is related to the state of the data written to magnetic medium 40, is controllable based on the direction that the current $I_1$ flows through conductive coil 20.

Stray magnetic fields from outside sources, such as a voice coil motor associated with actuation of magnetic writer 10 relative to magnetic medium 40, may enter SUL 44. Due to the closed magnetic path between main pole 12 and return pole 16, these stray fields may be drawn into magnetic writer 10 by return pole 16. In order to reduce or eliminate these stray fields, return pole 18 is connected to main pole 12 via magnetic stud 32 to provide a flux path for the stray magnetic fields. In addition, the strength of the write field through main pole 12 may be increased by causing current $I_2$ to flow through conductive coil 22. The magnetomotive force in the coils causes magnetic flux to travel from main pole tip 38 perpendicularly through medium layer 46, across SUL 44, and through return pole 18 and magnetic stud 32 to provide a closed magnetic flux path. The direction of current $I_2$ is opposite that of current $I_1$ to generate magnetic flux in the same direction through main pole 12. The effect of employing two return poles and two conductive coils is an efficient driving force to main pole 12, with a reduction on the net driving force on return pole 16 and return pole 18.

Main pole 14 and conductive coil 24 are incorporated into magnetic writer 10 to improve the write field gradient generated by main pole 12. Main pole 14 and conductive coil 24 are used to provide similar gradient control to that provided by trailing shield writer designs, in which a shield extends from the leading return pole toward the main pole at the ABS of the writer. Since this design does not include this additional material at the ABS, but provides similar gradient control, main pole 14 and conductive coil 24 are employed to provide "virtual shield." The incorporation of this virtual shield improves the field gradient of magnetic writer 10 by reducing the hard axis fields generated by main pole 12 and forcing the transition to be made on a mostly easy axis M-H loop. This not only improves the quality of the written transition at the downstream edge of magnetic writer 10, but also reduces or eliminates side track erasure and erasure after writing in magnetic writer 10.

In operation, when conductive coil 20 and conductive coil 22 are driven to generate magnetic flux through main pole 12, conductive coil 24 is driven to generate magnetic flux through main pole 14. The direction of current $I_3$ through conductive coil 24 is such that the magnetic flux through main pole 14 has a direction opposite that of the magnetic flux through main pole 12. In some embodiments, current $I_3$ has a magnitude less than the magnitudes of currents $I_1$ and $I_2$. The magnitude of current $I_3$ can be tuned to minimize fringing fields produced by main pole 12 at the trailing edge of main pole tip 38, thereby improving the field gradient at the trailing edge of main pole tip 38. This can be done after magnetic writer 10 is fabricated to account for manufacturing variations.

Figure 2:
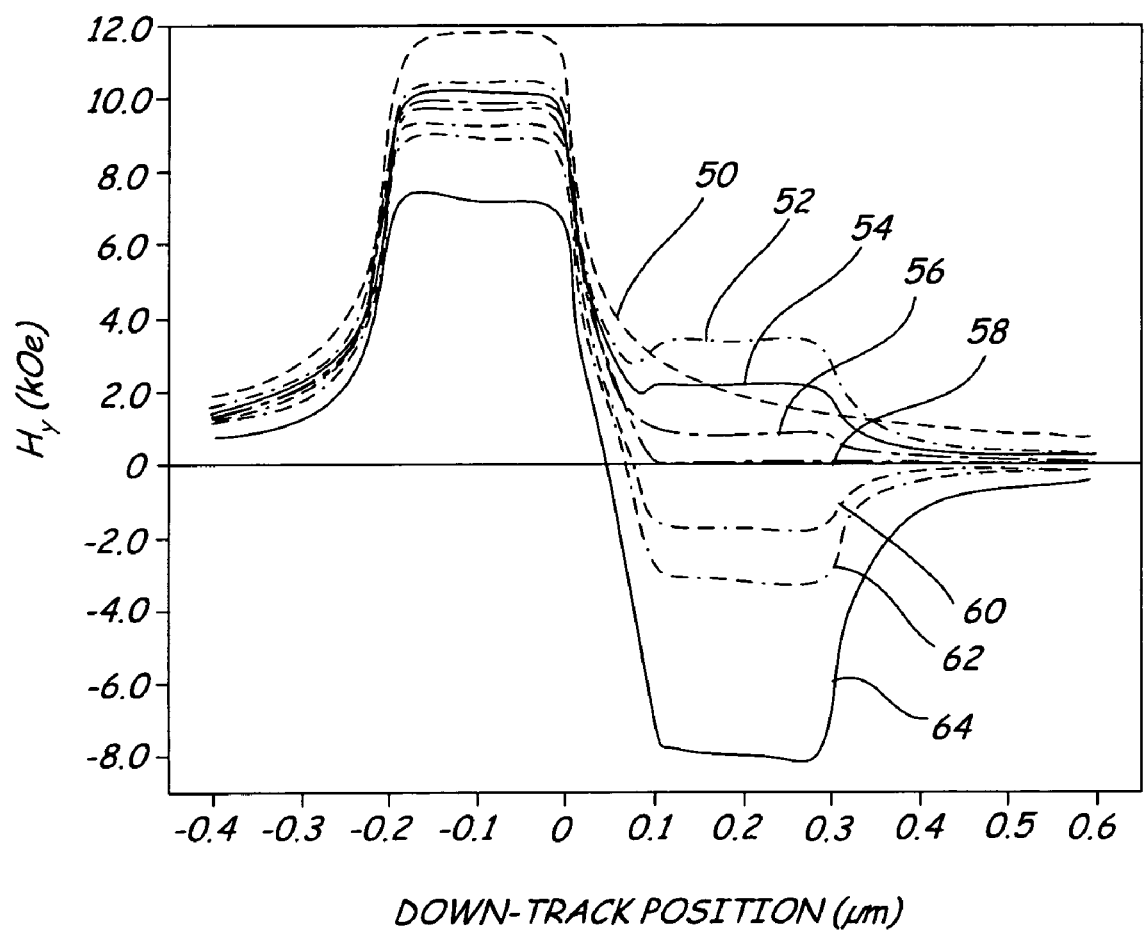
FIG. 2 is a graph of the down-track write field profile for a range of currents applied to the coil associated with the secondary write pole.

FIG. 2 is a graph of the down-track write field profile for magnetic writer 10 for a range of currents $I_3$ applied to conductive coil 24. The perpendicular component of the write field is plotted on the vertical axis, wherein the positive perpendicular field points toward magnetic writer 10 and the negative perpendicular field points toward magnetic medium 40. The down-track position of the field relative to main pole 12 is shown on the horizontal axis, wherein the trailing edge of main pole 12 is represented by a down-track position of 0 μm, down-track positions toward the trailing side of main pole 12 are represented by positive values, and down-track positions toward the leading side of main pole 12 are represented by negative values. In all plots, the current through conductive coil 20 and conductive coil 22 was 30 mA.

Line 50 is a plot of the down-track field profile of a conventional dual return pole magnetic writer in which main pole 14 and conductive coil 24 are eliminated from the structure shown in FIG. 1. The write field of this structure gradually weakens to a small perpendicular field at the trailing edge of main pole 12, rather than sharply transitioning at the trailing edge of write pole 12. The stray or remnant perpendicular write field further from the trailing edge of main pole 12 may result in side track erasure and erasure after writing in magnetic medium 40.

The remaining lines show plots of the down-track field profile for magnetic writer 10 for a range of currents $I_3$ applied to conductive coil 24. The following table shows the amplitudes of current $I_3$ for each of the lines shown:

| Line | Current $I_3$ (mA) |
|---|---|
| 52 | 0.0 |
| 54 | 3.0 |
| 56 | 6.0 |
| 58 | 8.0 |
| 60 | 12.0 |
| 62 | 15.0 |
| 64 | 30.0 |

For the configuration of magnetic writer 10 modeled, the currents $I_3$ applied to conductive coil 24 resulted in various levels of perpendicular field at the trailing side of main pole 12. When current $I_3$ was set to 8.0 mA, the field from main pole 14 opposed the field from main pole 12 at the trailing side of first main pole 12 such that the two fields canceled each other. As a result, the write field produced by magnetic writer 10 had a high perpendicular component at main pole 12 and up to the trailing edge, but which transitioned sharply downtrack from the trailing edge to net zero perpendicular field. This sharp transition not only provides for a sharper, higher quality written transition at the downstream edge of main pole 12, but also reduces or eliminates erasure after writing and side track erasure in magnetic medium 40.

Figure 3:
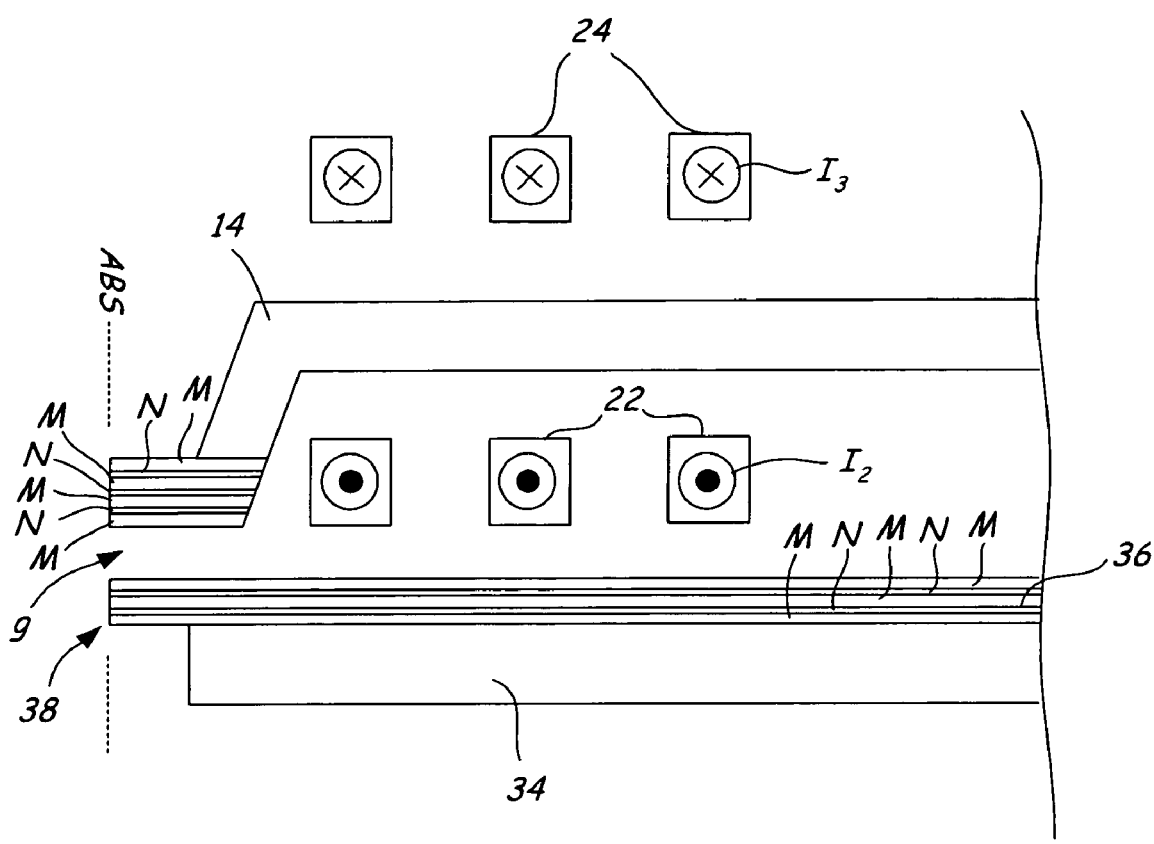
FIG. 3 is a detailed cross-sectional view of the primary and secondary write poles having multiple layer tip portions.

In order to reduce flux leakage across the gap between main pole 12 and main pole 14, and to increase the write field at the ABS, main pole 12 and main pole 14 (or portions thereof) may be laminated with alternating layers of magnetic material M and nonmagnetic material N. One such configuration is shown in the detailed cross-sectional view of magnetic writer 10 of FIG. 3. In this configuration, main pole body 36 of main pole 12 and the portion of main pole 14 proximate the ABS are laminated. In alternative configurations, yoke 34 may also be laminated and/or main pole 14 may be completely laminated. The layers of magnetic material M may also have different magnetic moments, such as providing materials with higher magnetic moments proximate to gap g and materials with lower magnetic moments distal from gap g.

In the laminated configuration, the nonmagnetic layers N decouple adjacent magnetic layers M, which cause the easy axes of magnetization of the magnetic layers M to align perpendicular to the ABS. In some embodiments, this decoupling causes the magnetizations of adjacent magnetic layers to orient antiparallel with respect to each other. By decoupling adjacent magnetic layers M, fringing magnetic flux, which can be strong enough to partially or completely erase information recorded on the same or adjacent tracks of magnetic medium 40, is reduced.

Magnetic writer 10 is shown merely for purposes of illustrating a construction that may be used in conjunction with main pole 14 to improve the field gradient at main pole tip 38, and variations on the design may be made. For example, while main pole 12 includes a yoke 34 and main pole body 36, main pole 12 can also be comprised of a single layer of magnetic material. Also, a single trailing return pole may be provided instead of the shown dual return pole writer configuration. In addition, while conductive coil 24 is shown disposed around magnetic stud 32, conductive coil 24 may alternatively be disposed around main pole 14. Also, while conductive coils 20 and 22 are shown disposed around respective magnetic studs 30 and 32, a single helical conductive coil may alternatively be disposed around main pole 12 to generate the write field through the main pole. Furthermore, a magnetic reader may be provided adjacent to and carried over magnetic medium 40 on the same device as magnetic writer 10.

In summary, the present invention relates to a magnetic writer that includes a first write element and a second write element. The first write element produces a first field when a first current is passed through a first coil. The second write element, which is disposed relative to the first write element, produces a second field when a second current is passed through a second coil such that the second field at least partially opposes the first field. A second write element that is driven by a dedicated coil to control the write field gradient generated by the first write element is easily manufacturable. Compared with conventional writer designs, the disclosed design is more manufacturable because it is less sensitive to variation in throat height as a result of lapping variation. In addition, the second write element eliminates much of the magnetic material at the air bearing surface of the device compared to previous gradient effecting designs. This, in combination with the lamination of both write elements, leads to better control of side track erasure and erasure after writing issues.

Although the present invention has been described with reference to preferred embodiments, workers skilled in the art will recognize that changes may be made in form and detail without departing from the spirit and scope of the invention.

The invention claimed is:

1. A magnetic writer comprising:
   a first write element that produces a first field when a first current is passed through a first coil;
   a first return element magnetically coupled to the first write element on a trailing side of the first write element; and
   a second write element disposed relative to the first write element that produces a second field when a second current is passed through a second coil, wherein the second field at least partially opposes the first field.

2. The magnetic writer of claim 1, wherein at least one of the first write element and the second write element comprises a multiple layer structure.

3. The magnetic writer of claim 2, wherein the multiple layer structure includes alternating magnetic and non-magnetic layers.

4. The magnetic writer of claim 2, wherein the multiple layer structure includes magnetic layers having different magnetic moments.

5. The magnetic writer of claim 1, wherein a magnitude of the second current is less than a magnitude of the first current.

6. The magnetic writer of claim 1, wherein the first current and the second current flow in opposite directions.

7. The magnetic writer of claim 1, wherein a gap between the first write element and the second write element is less than about 200 nm.

8. The magnetic writer of claim 1, wherein the first coil is partially disposed between the first write element and the second write element, and wherein the second coil is disposed on a side of the second write element opposite the first coil.

9. A magnetic writer comprising:
   a first write pole that generates a write field when a first current is passed through a first coil;
   a first return pole magnetically coupled to the first write pole on a trailing side of the first write pole; and
   a second write pole disposed between the first write pole and the first return pole that produces an auxiliary field when a second current is passed through a second coil that at least partially opposes the write field at the trailing edge of the first write pole.

10. The magnetic writer of claim 9, wherein at least one of the first write pole and the second write pole comprises a multiple layer structure.

11. The magnetic writer of claim 10, wherein the multiple layer structure includes alternating magnetic and non-magnetic layers.

12. The magnetic writer of claim 9, wherein a magnitude of the second current is less than a magnitude of the first current.

13. The magnetic writer of claim 9, wherein the first coil is partially disposed between the first write pole and the second write pole, and wherein the second coil is disposed on a side of the second write pole opposite the first coil.

14. The magnetic writer of claim 9, and further comprising:
   a second return pole magnetically coupled to the first write pole on a leading side of the first write pole.

15. A magnetic writer comprising:
   a first write element;
   a first return element coupled to the first write element by a first magnetic stud;
   a second write element magnetically coupled to the first magnetic stud; and
   a first conductor disposed around the first magnetic stud, wherein the first write element generates a write field when a first current is passed through the first conductor;
   a second conductor disposed around the first magnetic stud, wherein the second write element generates an auxiliary field that at least partially opposes the write field when a second current having a direction opposite the first current is passed through the second conductor.

16. The magnetic writer of claim 15, wherein at least one of the first write element and the second write element comprises a multiple layer structure.

17. The magnetic writer of claim 16, wherein the multiple layer structure includes alternating magnetic and non-magnetic layers.

18. The magnetic writer of claim 15, wherein a magnitude of the second current is less than a magnitude of the first current.

19. The magnetic writer of claim 15, wherein the first coil is partially disposed between the first write element and the second write element, and wherein the second coil is disposed on a side of the second write element opposite the first coil.

20. The magnetic writer of claim 15, and further comprising:
   a second return element magnetically coupled to the first write element by a second magnetic stud; and
   a third conductor disposed around the second magnetic stud that carries a third current having a direction opposite the first current.

21. The magnetic writer of claim 1, and further comprising:
   a second return element magnetically coupled to the first write element by a magnetic stud; and
   a third coil disposed around the magnetic stud that carries a third current having a direction opposite the first current.

22. The magnetic writer of claim 9, and further comprising:
   a second return pole magnetically coupled to the first write pole by a magnetic stud; and
   a third coil disposed around the magnetic stud that carries a third current having a direction opposite the first current.

23. A magnetic writer comprising:
   a first write element that produces a first field when a first current is passed through a first coil; and
   a second write element disposed relative to the first write element that produces a second field when a second current is passed through a second coil, wherein the second field at least partially opposes the first field, and wherein at least one of the first write element and the second write element comprises a multiple layer structure.

* * * * *